(12) United States Patent
Pribonic

(10) Patent No.: US 7,984,796 B2
(45) Date of Patent: Jul. 26, 2011

(54) MOTION RETARDING SYSTEM AND METHOD

(75) Inventor: Edward M. Pribonic, Seal Beach, CA (US)

(73) Assignee: Magnetar Technologies Corp., Seal Beach, CA (US)

( * ) Notice: Subject to any disclaimer, the term of this patent is extended or adjusted under 35 U.S.C. 154(b) by 950 days.

(21) Appl. No.: 11/869,629

(22) Filed: Oct. 9, 2007

(65) Prior Publication Data

US 2008/0087510 A1    Apr. 17, 2008

(51) Int. Cl.
*B60L 7/00* (2006.01)
(52) U.S. Cl. ............................................ 188/165
(58) Field of Classification Search ........... 188/159, 188/161, 164, 165
See application file for complete search history.

(56) References Cited

U.S. PATENT DOCUMENTS

| 5,628,385 | A | 5/1997 | Yumura et al. |
| 6,360,669 | B1 | 3/2002 | Albrich |
| 2002/0117378 | A1 | 8/2002 | Buchi et al. |
| 2004/0262103 | A1 | 12/2004 | Rosner |

*Primary Examiner* — Xuan Lan Nguyen
(74) *Attorney, Agent, or Firm* — Walter A. Hackler

(57) ABSTRACT

A motion retarding system includes a linear array of permanent magnets for providing a magnetic flux along with a diamagnetic member for engaging the magnetic flux and producing eddy currents in the diamagnetic member which results in the braking force between the linear array of permanent magnets and the diamagnetic member. A mechanism is provided for causing reciprocating movement of the diamagnetic member within the magnetic flux and coupling apparatus disposed in an operative relationship with the mechanism is provided for engaging a vehicle moving with respect to the mechanism, in order to reciprocate the diamagnetic member within the magnetic field and retard the motion of the vehicle past the mechanism.

4 Claims, 6 Drawing Sheets

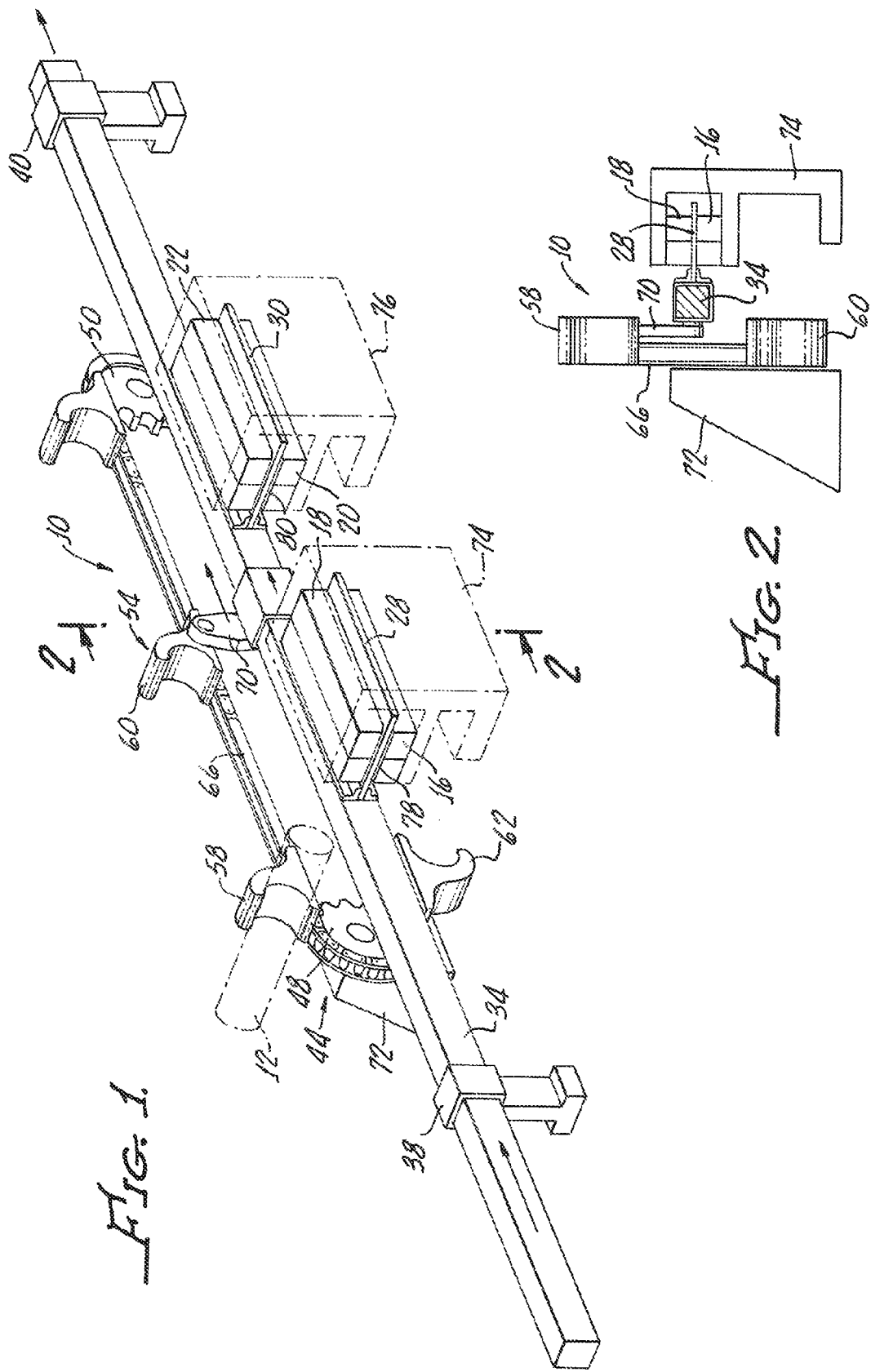

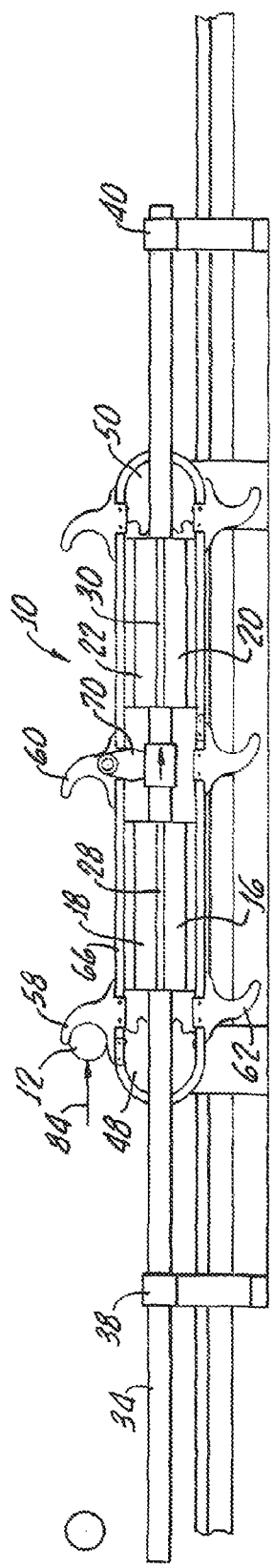
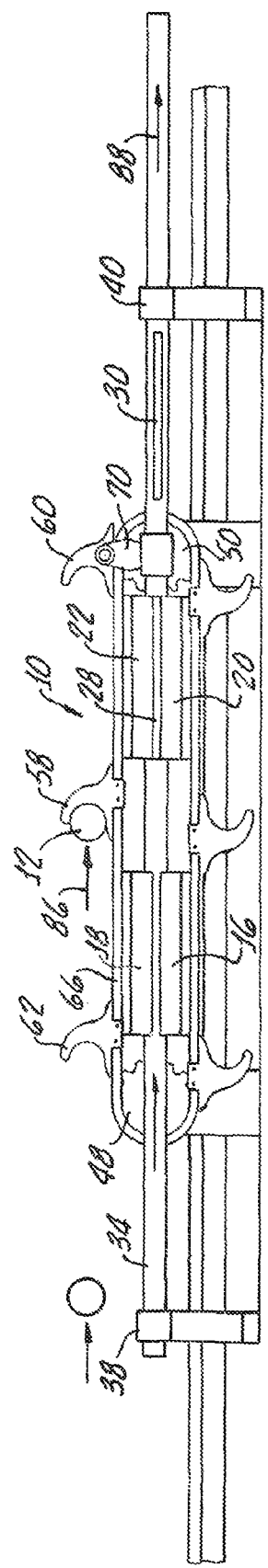

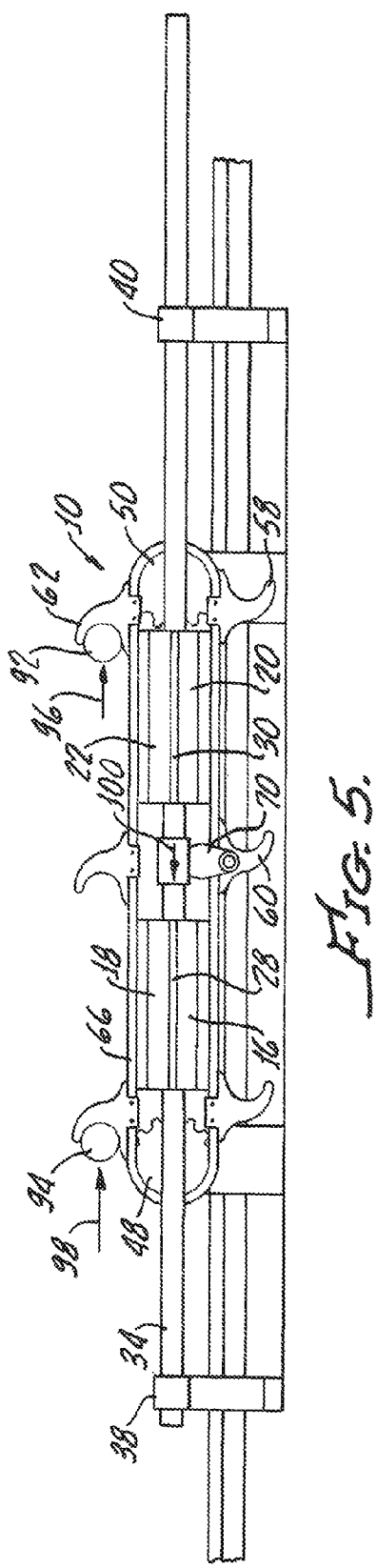
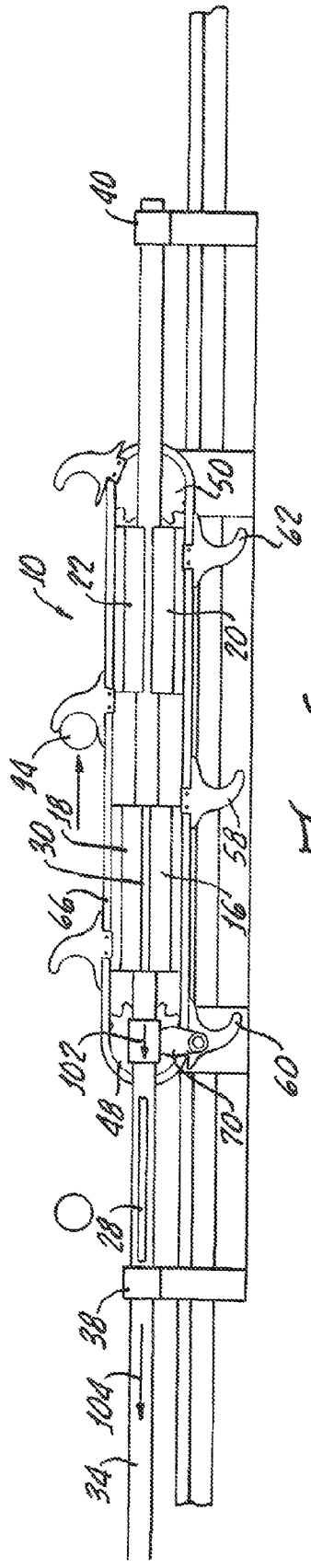

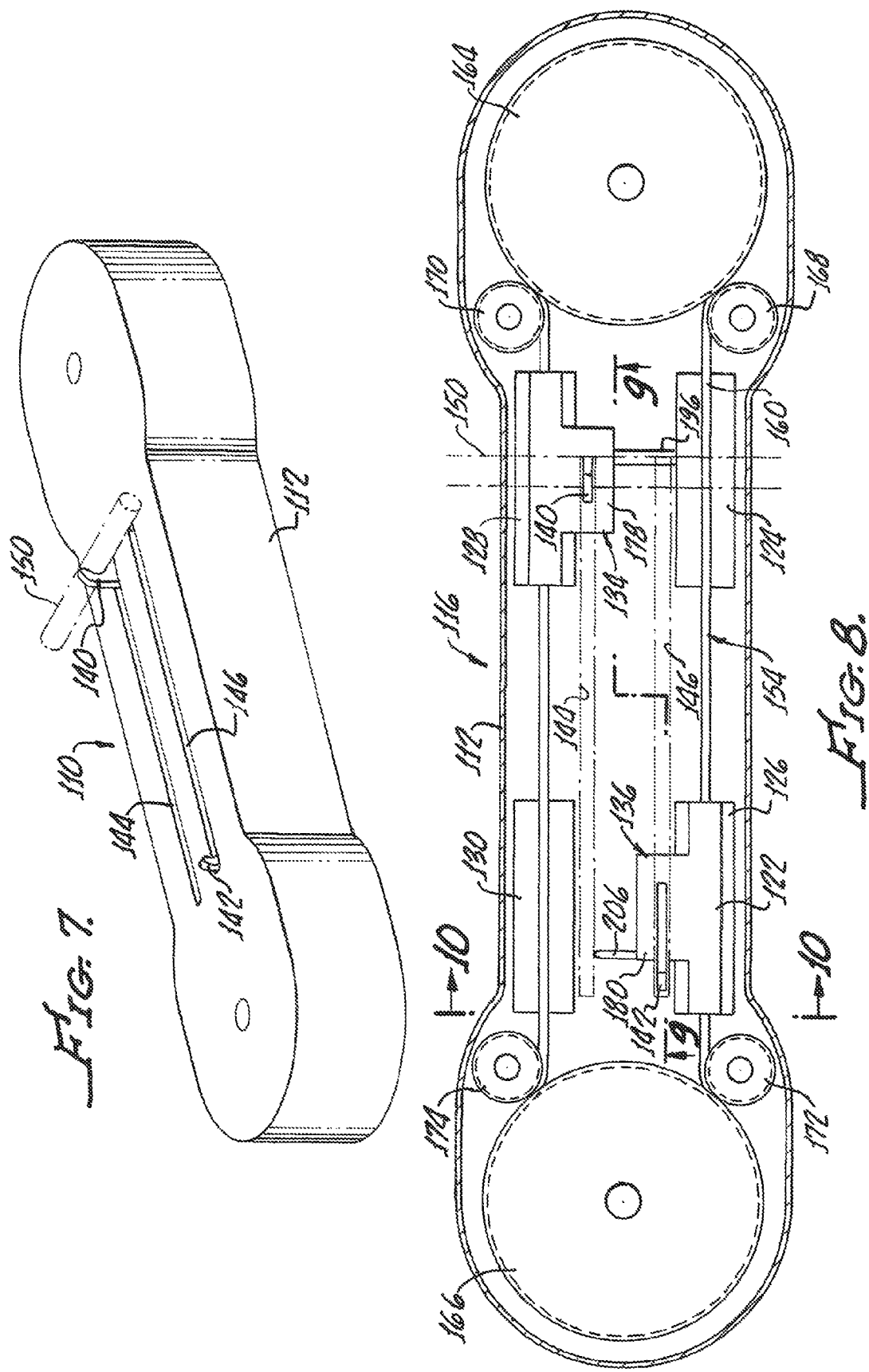

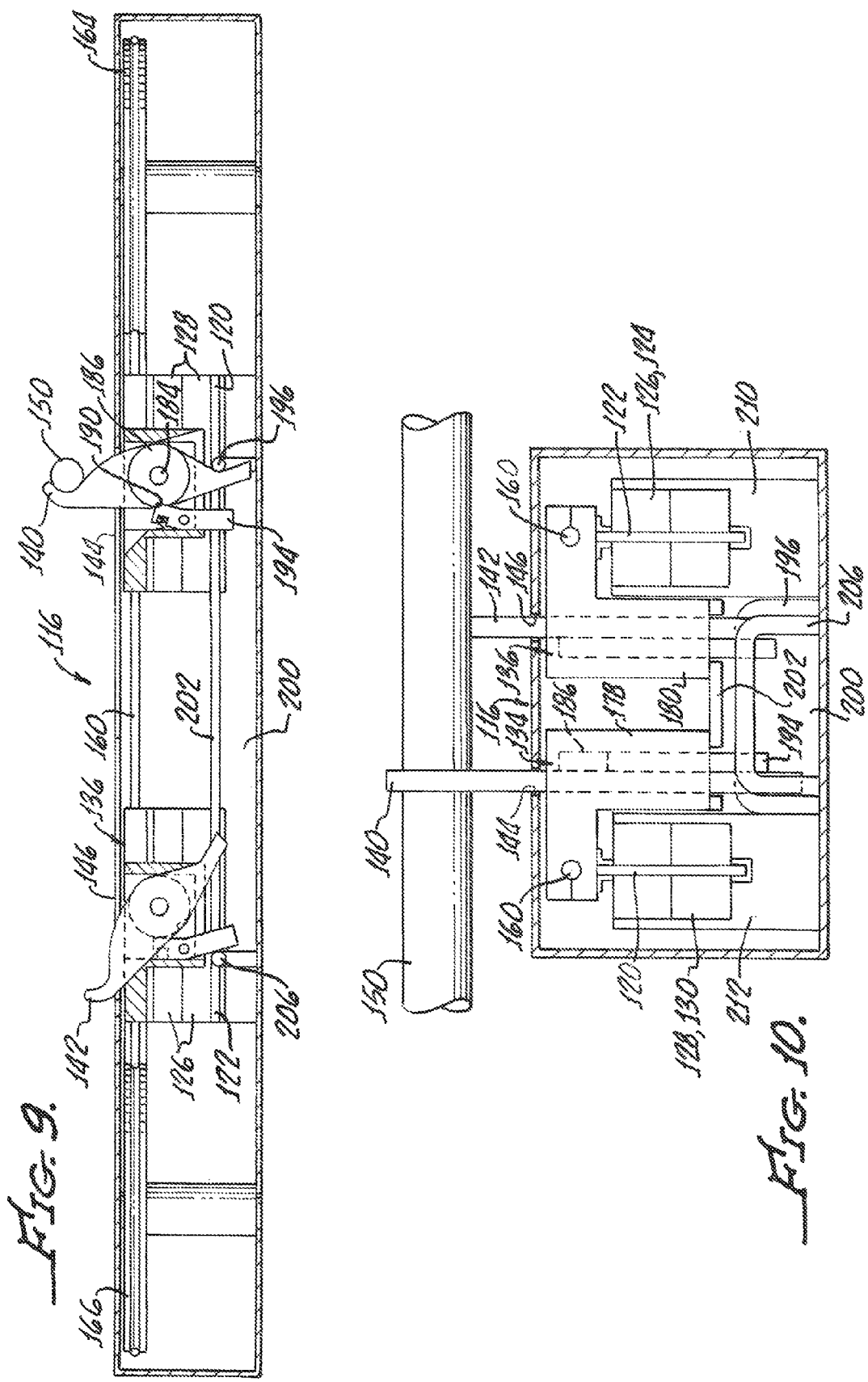

MOTION RETARDING SYSTEM AND METHOD

The present invention is generally related to permanent magnet brakes and is more particularly directed to an eddy current brake and magnet system for providing slowing, stopping, or controlling the rate of motion of objects or apparatus, for example, wheel supported moving apparatus such as railroad cars, mining and moving apparatus, elevator moving apparatus, conveyor moving apparatus, roller coaster moving apparatus, and magnetically levitated vehicles with apparatus, sliding apparatus, motor vehicles, and rolling objects such as pipe or logs, among others.

A number of eddy current braking devices have been developed. For example, U.S. Pat. No. 6,293,376 teaches a linear array of spaced apart permanent magnets for defining a slot therebetween along with a diamagnetic, or non-magnetic, fin disposed and sized for movement through the slot. A pivotal linkage enables the magnets to move with respect to the fin from a spaced apart first position to a second position in which the fin passes through the slot.

U.S. Pat. No. 6,533,083 provides for eddy current braking apparatus with a configuration of magnets and a conductive member enabling the braking system to be utilized over curvilinear paths.

U.S. Pat. No. 6,412,611 teaches an eddy current brake system with a dual use conductive fin which includes a linear array of permanent magnets and a non-magnetic electrically conductive fin in combination with a mechanical brake for frictionally engaging a fin.

U.S. Pat. No. 6,523,650 and U.S. Pat. No. 6,918,469 teach an eddy current braking apparatus which includes an array of spaced apart permanent magnets and a plurality of flux steering magnets in order to provide better performance brake.

U.S. Pat. No. 6,659,237 provides for an eddy current brake system utilizing a diamagnetic member, permanent magnets and apparatus for causing the velocity of the member to change the braking force between the magnets and the member.

All of the prior art including the hereinabove referenced patents is limited to applying a braking force during a single pass of the diamagnetic member through a magnetic flux established by permanent magnets. The present invention provides a more efficient motion retarding system by enabling reciprocating movement of a diamagnetic member within a magnetic flux established by magnets.

SUMMARY OF THE INVENTION

A motion retarding system in accordance with the present invention generally includes a linear array of permanent magnets for providing a flux and a diamagnetic member for engaging the magnetic flux and producing eddy currents in the diamagnetic member resulting in a braking force between the linear array of permanent magnets and the diamagnetic member.

A mechanism is provided for causing reciprocal movement of the diamagnetic member within the magnetic flux and coupling apparatus is disposed in an operative relationship with the mechanism for engaging a vehicle and operating the mechanism in order to reciprocate the diamagnetic member within the magnetic field and retard the motion of the vehicle pass the mechanism.

In one embodiment of the present invention, the coupling apparatus includes a continuous belt and a plurality of spaced apart dogs interconnected by the continuous belt and the mechanism includes a pair of spaced apart pulleys for supporting the continuous belt. The continuous belt and dogs pass around each pulley with at least one dog being connected to the diamagnetic member for causing reciprocation thereof as the dogs pass, with the continuous belt, around the pulleys.

The diamagnetic member may be disposed intermediate a top and bottom of the continuous belt and connected to an underside of one of the dogs by a link. In addition, the diamagnetic member may be disposed in a horizontal plane and the linear array of permanent magnets may be disposed in a parallel relationship therewith.

Further, a second diamagnetic member may be provided with the link connected to a member interconnecting the diamagnetic member and the second diamagnetic member.

Another embodiment of the present invention includes housing for enclosing the mechanism with the coupling apparatus including a pair of dogs extending through the housing slots for engaging the vehicle. The mechanism includes linkage between the dogs and the diamagnetic member for enabling movement of one dog, engaging the vehicle in a direction of travel of the vehicle, to cause movement of an unengaged dog in an opposite direction to the direction of vehicle travel.

Particularly, the linkage may include a continuous cable interconnecting the dogs and supported by two spaced apart pulleys.

More specifically, the dogs are attached to the cable by a couplings able to lock the dogs in an upright position adjacent one pulley and recline the dogs adjacent another pulley. Corresponding unlock cams and reset the cams are disposed in a spaced apart relationship and proximate each of the pulleys.

Each of the coupling in turn include a depending arm which is in an operational relationship with the unlock cam and the reset cam for locking and reclining the corresponding dogs as the dogs travel therepast.

A method in accordance with the present invention for retarding motion of a vehicle includes providing a linear array of permanent magnets for providing magnetic flux; providing a diamagnetic member for engaging the magnetic flux and producing eddy currents in said diamagnetic member resulting in a braking force between said linear array of permanent magnets and said diamagnetic member; and reciprocating said diamagnetic member within said magnet flux by engagement with a moving vehicle.

BRIEF DESCRIPTION OF THE DRAWINGS

The advantages and features of the present invention will be better understood by the following description when considered in conjunction with the accompanying drawings, in which:

FIG. 1 is a perspective view of one embodiment of the present invention generally showing a linear array of permanent magnets, a diamagnetic member for engaging in the magnetic flux provided by the permanent magnets, a mechanism for causing reciprocating movement of the diamagnetic member within the magnetic flux and coupling apparatus for engaging a vehicle axle in order to reciprocate the diamagnetic member within the magnetic field and retard the motion of the vehicle passing the mechanism;

FIG. 2 is a view of the system illustrated in FIG. 1 taken along the line 2-2;

FIGS. 3-6 illustrate operation of the system shown in FIGS. 1 and 2;

FIG. 7 is a perspective view of an alternative embodiment in accordance with the present invention generally showing a housing including a slot with a pair of dogs extending therethrough for coupling with a vehicle access shown in dashed line;

FIG. 8 is a plan view of the embodiment shown in FIG. 7, sans the housing, showing a pair of spaced apart pulleys with a cable therebetween attached to dogs for moving a diamagnetic member through magnetic fields established by fixed magnets;

FIG. 9 is a side view of the apparatus shown in FIG. 8 taken along the line 9-9 showing spaced apart unlock and reset cams disposed in a spaced apart relationship for operation of the dogs as they are moved by a vehicle axle;

FIG. 10 is a view taken along line 10-10 of FIG. 8 showing an end view of the embodiment.

DETAILED DESCRIPTION

Figure 11:
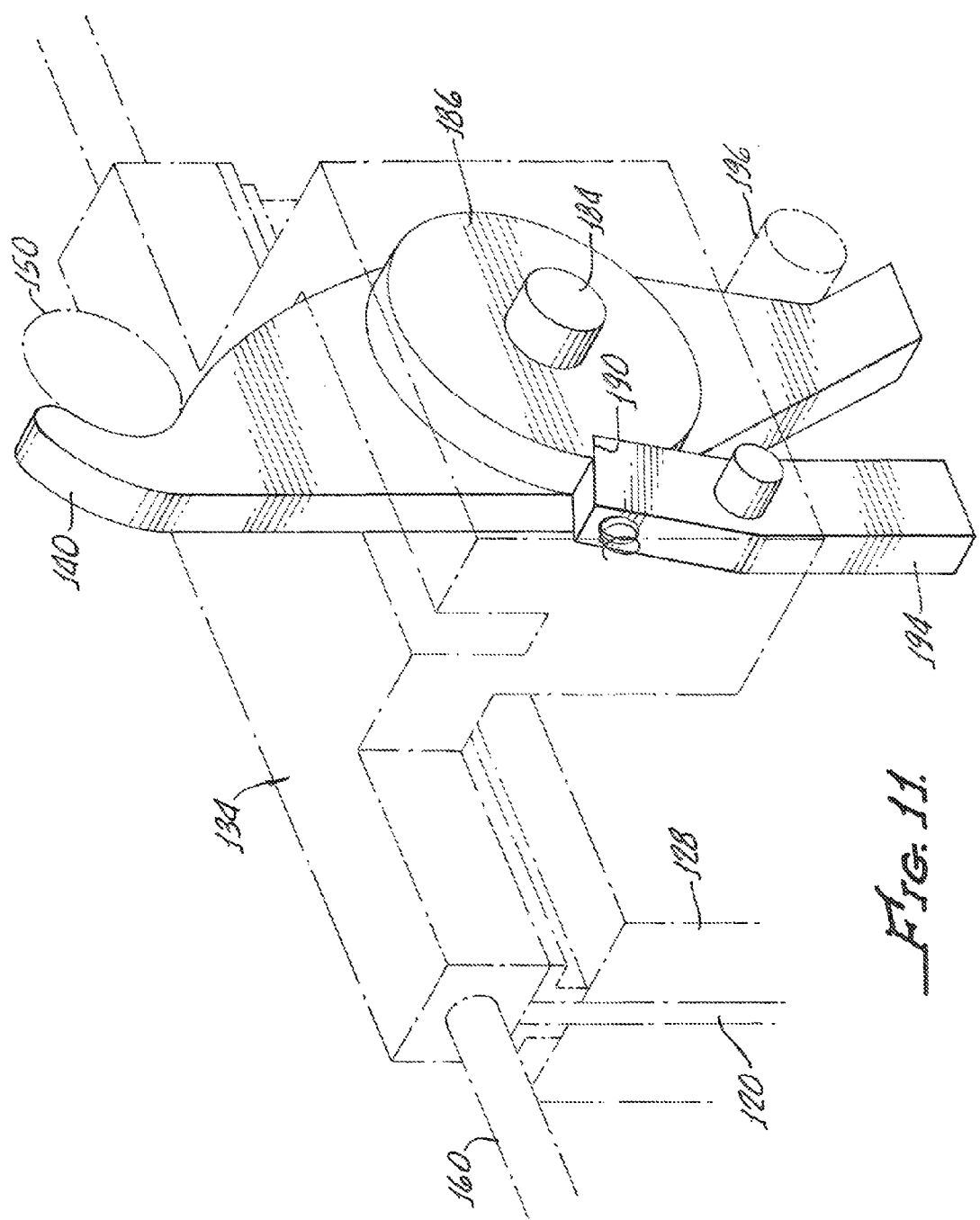
FIG. 11 is an enlarged view of a dog along with coupling apparatus interconnected to the dog diamagnetic member and cable along with the ratchet and a dog reset cam for causing a ratchet to block the cam in an upright position for engaging axle.

With reference to FIGS. 1-6 there is shown a motion retarding system 10 in accordance with the present invention for retarding the motion of a vehicle (not shown) therepast by way of engaging a vehicle axle 12 or the like.

The system 10 includes permanent magnet linear arrays 16, 18, 20, 22 along with diamagnetic members 28, 30 for engaging magnetic flux established by the arrays 16, 18, 20, 22 which results in a braking force between the linear arrays 16, 18, 20, 22 and the diamagnetic members 28, 30.

The diamagnetic members are fixed to a shaft 34 supported by bearings 38, 40 for reciprocation as will be hereinafter described in greater detail.

A mechanism 44 is provided for causing reciprocated movement of the shaft 34 and diamagnetic members 28, 30 and includes a pair of spaced apart pulleys 48, 50. Coupling apparatus 54 is provided and disposed in an operative relationship with the mechanism 44 for engaging the axle 12, moving with respect to the mechanism 44, in order to reciprocate the shaft 34 and diamagnetic members 28, 30.

The coupling apparatus 54 includes a plurality of spaced apart dogs 58, 60, 62 interconnected by a continuous belt 66. The continuous belt 66 and dogs 58, 60, 62 pass around each pulley 48, 50 with one dog 60 being connected to the diamagnetic members 28, through the shaft 34 by a link 70.

Any suitable support structure 72 may be utilized to position the system 10 for engagement of the dogs 58, 60, 62 with the passing axle 12. Magnetic support structure 74, 76 support corresponding magnet arrays 16, 18 and 20, 22 in a conventional manner with a slot 78, 80 therebetween for establishing a magnetic flux therebetween through which the corresponding diamagnetic members 28, 30 pass.

Operation of the system 10 and reciprocal movement of the shaft 34 and diamagnetic members 28, 30 is illustrated in FIGS. 3-6. In FIG. 3, the diamagnetic members 28, 30 are centered within the magnets as the axle 12 moving in a direction of an arrow 84 engages the dog 58. Continued movement of the axle 12 pushing the dog 58, indicated by the arrow 86 in FIG. 4 moves the shaft 34 and diamagnetic members 28, 30 to the position illustrated in FIG. 4 and arrow 88.

Continued movement of the dogs 60, 58 around the pulley 50 is continued by following axles 92, 94 as indicated by the arrows 96, 98. This continued movement causes the dogs 58, 60 to pass under the pulley 50 and through the coupling 70 between the dogs 60 and shaft 34 causes the diamagnetic members 28, 30 to move in an opposite direction as illustrated by the arrow 100 in FIG. 3 and arrows 102, 104 in FIG. 6 thus establishing a reciprocal movement of the diamagnetic members 28, 30 within the magnetic field established by the magnetic arrays 16, 18, 20, 22.

With reference to FIG. 7, there is shown an alternative embodiment motion retarding system 110 generally showing a housing 112 for enclosing a mechanism 116, shown in FIG. 8, causing reciprocal movement of diamagnetic members 120, 122 with magnetic field established by permanent magnet arrays 124, 126, 128, 130. Coupling apparatus 134, 136 includes dogs 140, 142 extending through housing slots 144, 146 as illustrated in FIG. 7 for engaging a vehicle axle 150 shown in phantom line in FIG. 7.

The mechanism 116, shown in FIG. 8, includes linkage 154 for enabling movement of one dog 140 engaging the vehicle axle 150 to cause movement of an unengaged dog 142 in an opposite direction to a direction of traffic vehicle indicated by the arrow 158 in FIG. 7.

The linkage 154 includes a continuous cable 160 interconnecting the dogs 140, 142 by way of the coupling apparatus 134, 136, with the cable 160 being supported by two spaced apart pulleys 164, 166 and idlers 168, 170, 172, 174 that cooperate with the pulleys 164, 166 respectively to provide parallel linear sections of the cable 160.

As shown in FIGS. 8, 10, and 11, the coupling apparatus 134, 136 includes dog housings 178, 180 for coupling the dogs 140, 142 to the cable 160 as well as the diamagnetic members 120, 122 as shown in FIGS. 9, 10, 11. The dog 140 is pivotally mounted to the dog housing 178 by a pivot 184 and a ratchet 186 is fixed to the dog 144 for rotation therewith about the pin 184. The ratchet 186 includes a notch 190 for engaging with a pivot arm 194 to lock the dog 140 in an upright position for engagement with the axle 150. Rotation of the dog and ratchet 186 being caused by a reset cam 196 as the dog 140 is moved to the position shown in FIG. 9 with the dog housing 78 being moved along slide member supports 200 on slide members 202 as shown in FIG. 10.

As shown in FIG. 9, the reset cam 196 is disposed proximate the pulley 164.

Proximate the pulley 166, a ratchet unlike unlock cam 206 engages the pivot arm 194 illustrated in phantom line in FIG. 9 to rotate the pivot arm away from the ratchet notch 190 thus enabling the dog 140 to recline as represented by the recline dog 142 in FIG. 7. It should be appreciated that the dogs 140, 142 thus travel back and forth through the slots 144, 146 and the mechanism 160, herein described, reciprocates the diamagnetic members 120, 122 through the magnetic fields established by the magnet arrays 124, 126, 128 which may be disposed in magnet housings 210, 212, see FIG. 10.

A method for retarding motion of a vehicle is provided by the system 10, 110.

Although there has been hereinabove described a specific motion retarding system and method in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A motion retarding system comprising:

a linear array of permanent magnets for providing a magnetic flux;

a diamagnetic member for engaging the magnetic flux and producing eddy currents in said diamagnetic member resulting in a braking force between said linear array of permanent magnets and said diamagnetic member;

a mechanism for causing reciprocating movement of said diamagnetic member within said magnetic flux;

coupling apparatus, disposed in an operative relationship with said mechanism, for engaging a vehicle moving with respect to said mechanism, in order to reciprocate said diamagnetic member within said magnetic field and retard the motion of the vehicle past said mechanism, said coupling apparatus comprises a continuous belt and a plurality of spaced apart dogs interconnected by said continuous belt and said mechanism comprises a pair of spaced apart pulleys for supporting said continuous belt, said continuous belt and dogs passing around each pulley with one dog being connected to said diamagnetic member for causing the reciprocation thereof as the dogs pass, with said continuous belt, around the pulleys.

2. The system according to claim 1 wherein said diamagnetic member is disposed intermediate a top and a bottom of said continuous belt and connected to an underside of said one dog by a link.

3. The system according to claim 2 wherein said diamagnetic member is disposed in a horizontal plane and said linear array of permanent magnets is disposed in a parallel relationship therewith.

4. The system according to claim 3 further comprising a second diamagnetic member and said link is connected to a member interconnecting said diamagnetic member and said second diamagnetic member.

* * * * *